Fig. 7

United States Patent Office

3,182,514
Patented May 11, 1965

3,182,514
TWO AXIS CASE ROTATING GYROSCOPE
Walter J. Krupick, Franklin, Jay Hoffman, Livingston, and Claudio Joseph Ballester, Wanaque, N.J., assignors to General Precision Inc., Little Falls, N.J., a corporation of Delaware
Filed Jan. 5, 1961, Ser. No. 80,879
11 Claims. (Cl. 74—5)

This invention relates to gyroscopes and is particularly directed to gyroscopes used for aircraft, guided missiles and the like.

It is primarily directed to a two degree of freedom gyro.

The conventional type of gyroscope is subject to a large number of errors, some of which are readily determinable, and can therefore be readily corrected for, while others vary either in a specific pattern or varying patterns.

The primary feature of the present invention is that it provides a two axis case rotating gyroscope, which improves the performance and simplifies manufacture over the conventional type of gyroscope.

Another feature is that provision is made for counter-rotation of the outer races of some of the anti-friction bearings used in the apparatus, thus equalizing bearing loads, reducing friction, and minimizing gyro errors due to the bearings.

A major feature of the gyro construction is that it substitutes a sinusoidal error curve for the linear error of the conventional type of gyro.

The primary advantage of case rotation over the conventional type of gyro operation, is that the drift error which is relatively constant in one direction, and linear, is converted to a sinusoidal function, which averages out to zero through one complete revolution of the casing.

Another feature is that the device is broken up into several sub-assemblies, to facilitate assembly, manufacture and servicing.

The accompanying drawings, illustrative of one embodiment of the invention and several modifications thereof, together with the description of their construction and the method of adjustment, operation, actuation and utilization thereof, will serve to clarify further objects and advantages of the invention.

It will be understood that the following description of the construction, operation and method of control and utilization of the "Gyro Fitted With Rotating Case" is intended as explanatory of the invention and not restrictive thereof.

In the drawings, the same reference numerals designate the same parts throughout the various views, except where otherwise indicated.

Figures 1, 1A, 4, 6:
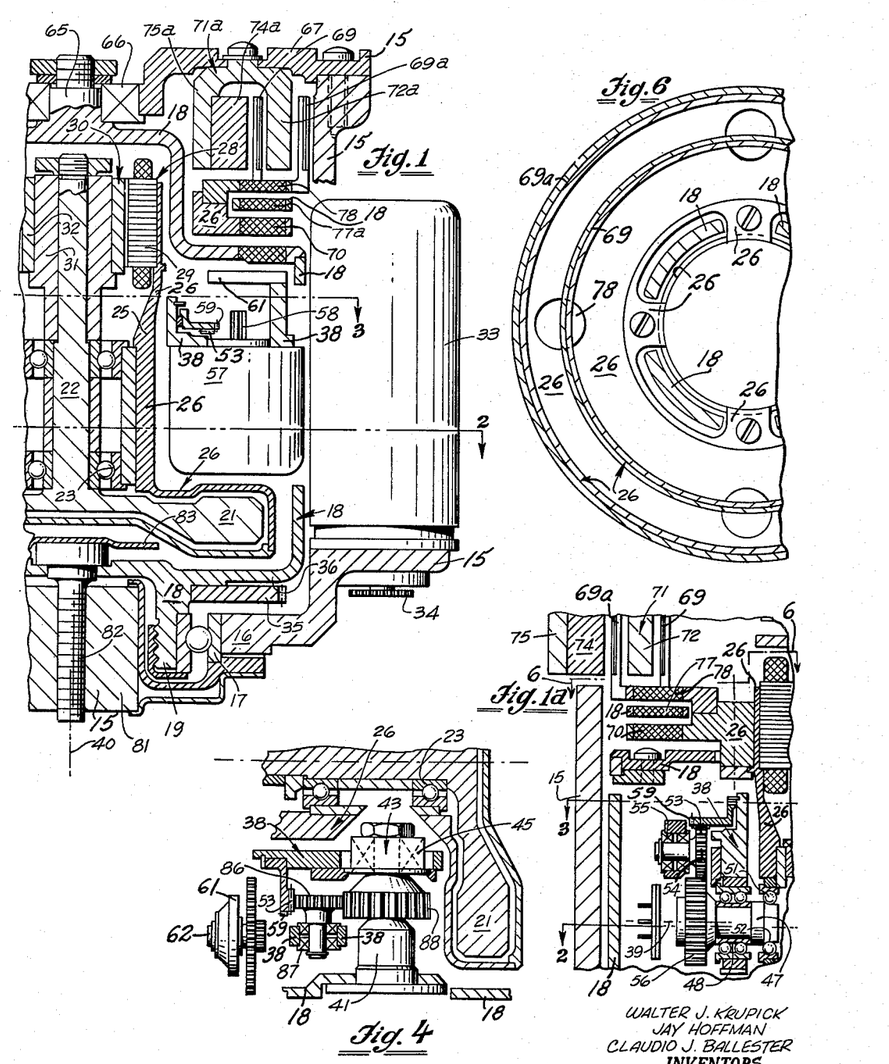
FIGURE 1 is a vertical section through the case rotating gyroscope, shown in FIGURES 2 and 3.
FIGURE 1a is a vertical section, similar to FIGURE 1, of the left-hand portion of the gyro mechanism, shown in FIGURE 1.
FIGURE 4 is a vertical section through another portion of the contra-rotating bearing drive mechanism shown in FIGURE 1, the section being taken on the line 4—4, FIGURE 2.
FIGURE 6 is a partial cross-section and partial plan view of a portion of the gyro apparatus, shown in FIGURES 1 and 2.
Figures 2, 3, 5:
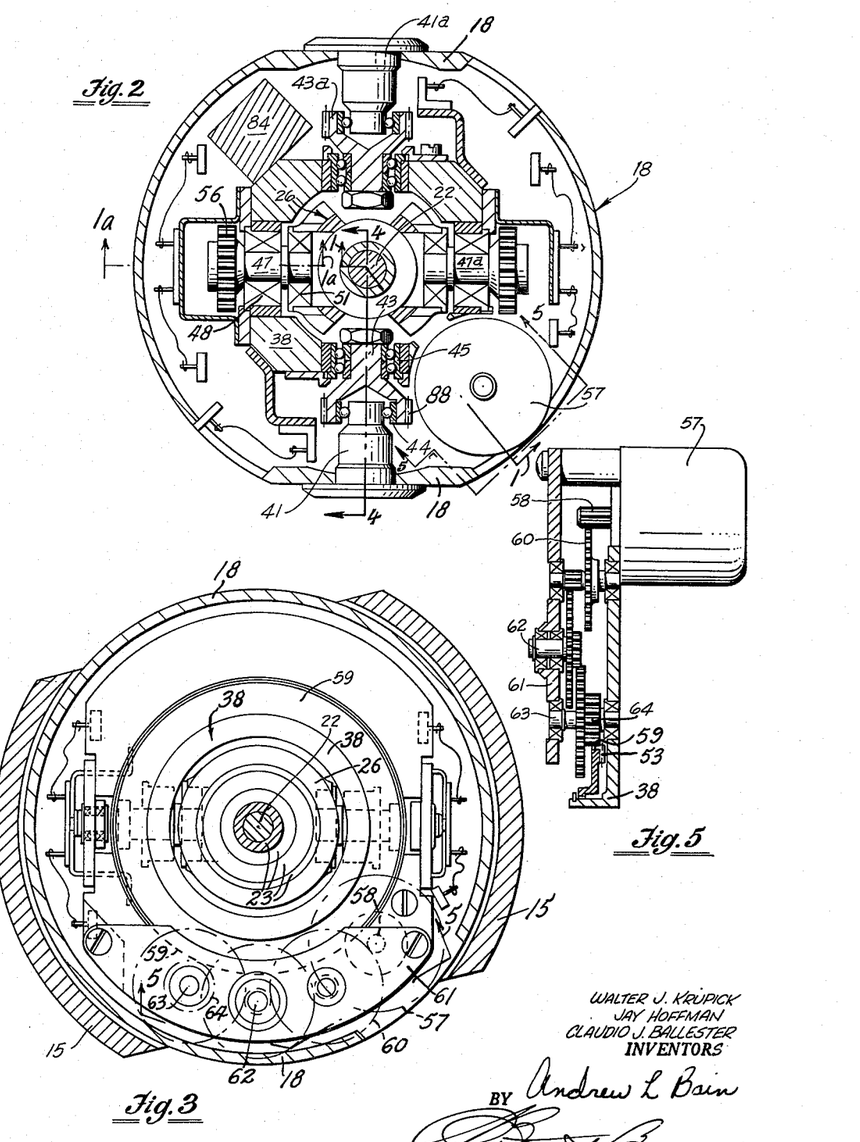
FIGURE 2 is a cross-section through the gyroscope shown in FIGURE 1, taken on the line 2—2, FIGURE 1.
FIGURE 3 is a cross-section through a portion of the gyroscopic control mechanism, shown in FIGURE 1, taken on the line 3—3, FIGURE 1.
FIGURE 5 is a vertical section through a portion of the contra-rotating gear train, shown in FIGURES 1 and 2, the section being taken on the line 5—5, FIGURE 2.

One embodiment of the construction shown in FIGURES 1, 2 and 3, is mounted in a hollow substantially cylindrical outer case 15, having a partially closed bottom wall with a hub 16 integral with the bottom wall, an antifriction bearing 17 being fitted to the hub of the outer case.

An inner cupped rotatable housing 18 is fitted to the interior of the outer case, the housing having a smaller diameter tubular extension 19 integral with the bottom wall thereof, the tubular extension being supported by the bearing 17 supported by the outer case.

A flat substantially circular flywheel 21, having a central shaft 22, integral therewith and projecting upward therefrom is fitted to the interior of the rotatable housing, the flywheel shaft being rotatably supported by a plurality of anti-friction bearings 23, which are supported by the tubular upper, or motor housing section 25 of a pitch gimbal 26, the hollow circular lower portion of which surrounds the body of the flywheel 21.

The flywheel shaft 22 is driven by a synchronous motor 28, fitted to the upper end of the tubular upper section of the pitch gimbal the motor consisting of a stator 29, fitted to and supported by the tubular upper section 25, and a rotor 30, which is attached to a tubular spacer 31, which is attached to and supported by the flywheel shaft 22.

The outer diameter of the rotor 30 is formed by a tubular hysteresis ring 32, which is fixedly attached to the tubular spacer 31, co-axially with the flywheel shaft, an annular air gap being formed between the hysteresis ring and the stator 29.

The rotatable inner housing 18 is driven by a combination synchronous motor and gear head 33, shown in FIGURE 1, a pinion 34, attached to a shaft at the lower end of the motor and gear head, driving a driven ring gear 35, which is mounted adjacent the bottom wall 36, of the inner housing, and pressed on, or otherwise attached to the tubular extension 19 of the housing 18, co-axially therewith. A reduction gear train meshing with the pinion 34 and the ring gear 35, is provided to step down the speed of rotation of the output shaft of the motor and gear head combination and the pinion 34 attached thereto, and drive the ring gear 35 in a manner hereinafter described.

A roll gimbal 38, which is pivotally supported on an axis 39, substantially perpendicular to the axis 40 of rotation of the housing 18 is mounted within the housing 18.

The roll gimbal 38 is supported by a pair of stub shafts 41, 41a which project inward from and are supported by the housing 18 in the same plane as the perpendicular axis 39.

Intermediate shafts 43, 43a are supported by each of the stub shafts 41, 41a, an antifriction bearing 44, the balls of which ride directly on a cylindrical extension of the stub shaft rotatably supporting the intermediate shafts 43.

The intermediate shafts 43 in turn rotatably support the roll gimbal, a pair of anti-friction bearings 45, co-axial with the bearing 44, supporting the roll gimbal from the outer diameter of the solid portion of each intermediate shaft.

A pair of counter-rotating bearing shafts 47, located in the plane of the axis of the intermediate shafts 41, 41a and substantially perpendicular to the axis of the intermediate shafts 41, 41a is provided to support the tubular upper or motor housing section 25 of the pitch gimbal 26, as shown in FIGURES 1 and 2.

A pair of ball bearings 48, support the tubular upper or motor housing section 25 of the pitch gimbal 26 from the roll gimbal 38, as shown in FIGURES 1 and 1a, an anti-friction bearing 48 being mounted between each counter-rotating bearing shaft 47, and the adjacent portion of the roll gimbal 38.

The tubular upper or motor housing section 25 of the pitch gimbal 26 is supported by a pair of angular contact bearings 51, which ride directly on the angular contact ball race 52, formed directly on the inner end of each of the bearing shafts 47.

The inner races of the bearings 48, 48a fitted to the bearing shafts 47, are rotated by a train of gears shown in FIGURE 1. This train of gears includes an annular face gear 53, which is supported by a tubular upper extension of the roll gimbal 38, the face gear meshing with a plurality of idler pinions 54, each of which is supported by a pair of miniature ball bearings 55, fitted to an extension of the roll gimbal 38, each of the idler pinions 54 meshing with a small spur gear 56, which is integral with the outer end of each counter-rotating bearing shaft 47.

The face gear 53, which drives the gears 56 integral with or attached to the bearing shafts 47 is driven by a motor 57, having a pinion drive shaft 58 integral therewith, in a manner hereinafter described.

The motor drive pinion drives a first planetary gear 60 (see FIGURE 5), which is mounted on an idler shaft, which is supported by a lower plate integral with the roll gimbal 38, and an upper plate 61, substantially parallel to the lower plate.

A pair of idler shafts 62, 63 is driven by the idler gear 60, shown in FIGURE 5, by means of a plurality of reduction pinions and gears supported by the idler shafts 62, 63, a pinion 64 integral with, or supported by the idler shaft 63, meshing with the ring gear 59, to drive the ring gear 59, and the face gear 53 integral therewith.

Figures 12, 13, 14:
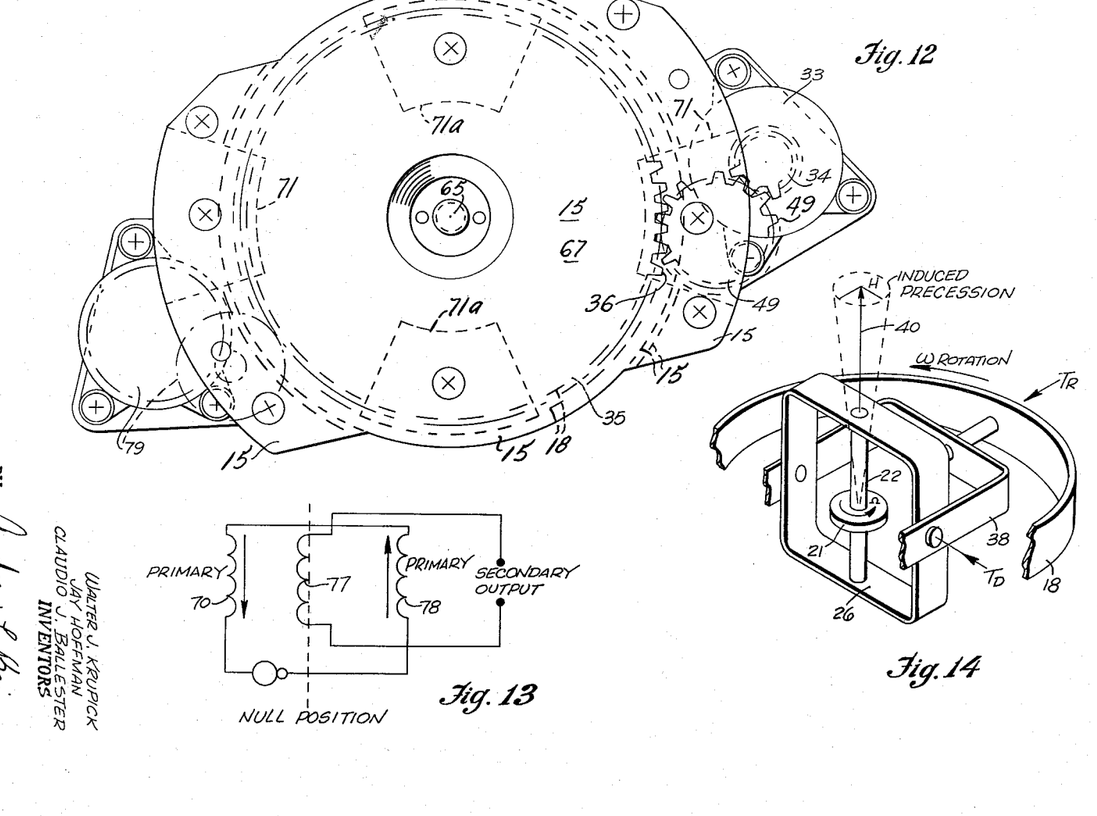
FIGURE 12 is a plan view of the gyro assembly shown in FIGURE 1.
FIGURE 13 is a schematic diagram of the pick-off coils shown in FIGURE 1.
FIGURE 14 is a schematic diagram of the case rotating gyro shown in FIGURES 1, 2 and 3, showing the direction of rotation of the various elements of the apparatus.

As shown in FIGURE 12, an idler gear 49 is incorporated between the motor pinion 34 and the ring gear 35, which is attached to and drives the rotating housing 18, thus transmitting the rotation of the motor pinion 34, and therefore the rotation of the motor 33 to the rotating housing 18.

A stub shaft 65 integral with the upper end of the rotatable housing is rotatably supported by an anti-friction bearing 66, which is supported by the central hub of a cover plate 67, which is supported by the central hub of a cover plate 67, which is attached to the open upper end of the outer case 15, as shown in FIGURE 1.

The rotatable housing is therefore supported by two bearings, the upper bearing 66 and a lower bearing 17, coaxially aligned with the upper bearing 66.

A pair of tubular torquer coils 69, 69a, is attached to a flat substantially circular extension 70, which is attached to the open upper end of the pitch gimbal 26.

A pair of magnet support brackets 71, 71a of circular segmental contour, and U-shaped cross-section, is attached to and suspended from the plate 67, attached to the open upper end of the case 15.

The right-hand leg 72, 72a of each of the brackets is inserted into the air gap between the torquer coils 69, 69a, one leg 72, being located at the left-hand side, of FIGURE 1a, the second leg 72a at the right-hand side, FIGURE 1.

A pair of permanent magnets 74, 74a is attached to one pair of legs 75 (left-hand), FIGURE 1a, of the brackets shown in FIGURES 1 and 1a one pair of magnets 74 being located adjacent the circumferential outer face of one of the torque generating coils 69a, the second pair of magnets 74a being located adjacent the circumferential inner face of the inner torque generating coil 69.

The permanent magnets 74, 74a are located diametrically opposite one another, the two pairs being 90° apart.

A set of four sensing pick-off coils, 77, 77a, radially aligned with the permanent magnets 74, 74a, is located in an annular gap between the pick-off excitation coils, 70 attached to the annular extension, attached to the pitch gimbal 26, and additional pick-off excitation 78 coils attached to an annular plate which is substantially parallel to the annular extension 70.

The pick-off coils 77, 77a are provided to indicate the angular displacement of the pitch gimbal 26, about the axis 39 through the shafts 47, 47a, and the axis through the stub shafts 41, 41a which is substantially perpendicular to the axis through the shafts 47, 47a, one pair of pick-offs 77, 77a indicating the angular displacement about one axis 39, the other pair indicating the displacement about the perpendicular axis.

The pick-off signals from the pick-off coils 77, 77a are transmitted to a resolver 79, shown in FIGURE 12, the resolver 79 converting the signals received from rotary space to stationary space signals.

The torque generating coils 69, 69a are controlled by a voltage transmitted circumferentially through the torque generating coils 69, 69a.

As the permanent magnets 74, 74a are stationary, the force generated by the magnets in co-ordination with the voltage through the torque generating coils 69, 69a, tend to operate on fixed space axes through the magnets 74, 74a rather than the axis 39 through the shafts 47, and the axis of the stub shafts 41, 41a which are in rotation due to the rotation of the housing 18, and the pitch gimbal 26.

As these stub shaft axes are in rotation, the co-ordinates of the fixed space torques acting through the axes of the permanent magnets 74, 74a, tend to restore the pitch gimbal 26 to its normal position, after displacement.

A brush block 81 is provided within the depending tubular extension 19 of the rotating housing 18, the brushes on the brush block co-acting with a commutator, mounted on a stub shaft 82, which is attached to the bottom wall of the rotating housing, co-axially with the housing, to transmit voltage to a flexible contact 83, mounted in contact with the upper end of a shaft contact in engagement with the upper end of the commutator stub shaft 82.

A counterweight 84, is provided in diametrical alignment with the drive motor 57 shown in FIGURE 2, the counterweight being adapted to counterbalance the weight of the motor 57, as shown in FIGURE 2.

FIGURE 4 shows the reduction gear drive mechanism utilized for rotatably driving the intermediate shafts 43, 43a, which are supported by the stub shafts 41, 41a.

As the intermediate shafts 43, 43a support the outer races of one pair of bearings 44, and the inner races of another pair of bearings 45, the rotation of the intermediate shafts correspondingly rotate these races of the bearings.

The reduction gear mechanism is so constructed that when one of the intermediate shafts 43 is rotated in one direction, the diametrically aligned intermediate shaft 43a is rotated in the opposite direction.

The ring gear 59 attached to the pitch gimbal 26, has a face gear 53 integral therewith, the face gear 53 meshing with an idler gear 86, which is supported by a pair of miniature bearings 87 fitted to an extension of the pitch gimbal 26, the idler gear meshing with an external gear 88, formed on the tubular portion of the intermediate shaft 43, 43a.

Thus the ring gear 59 which is driven by the motor 57 and drives the stub shafts 47, 47a also controls the rotation of the intermediate shafts 43, 43a.

As the gears 86, 86a are driven by opposite sides of the same face gear 53, they rotate in opposite directions, thus balancing the torques on opposite sides of the axis 40.

In the same manner, the gears 56, which rotate the pivot shafts 47, are also driven by opposite sides of the same face gear 53.

This causes both diametrically aligned pivot shafts to rotate in opposite directions, thus balancing the torques on opposite sides of the axis 40 and providing for counter-rotation of the bearings 48 and 51, fitted to the pivot shafts 47, 47a.

Figure 7:
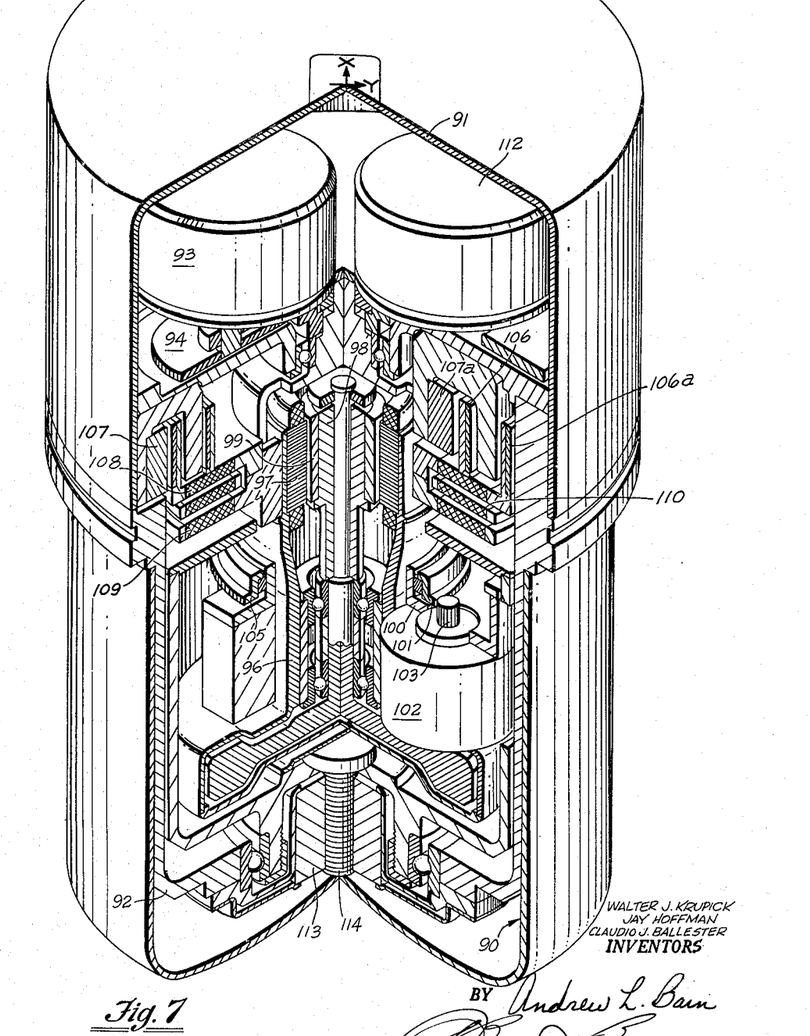
FIGURE 7 is a cutaway modified perspective view and partial section through a modification of the gyroscope construction shown in FIGURE 1.

FIGURE 7 shows a modification of the rotatable housing gyroscope shown in FIGURE 1.

Fundamentally, this unit is essentially the same as that shown in FIGURES 1, 2 and 3, except for several modifications hereinafter described in detail.

The case is divided into two sections, including a cupped lower case 90, of substantially circular cross-section, and a similarly cupped cap 91, which fits over a piloted upper section of the lower case.

The cupped rotatable housing 92, is similar to that shown in FIGURE 7. The housing is driven by a drive motor 93, located near the upper end of the unit, inside the cap 91, a pinion shaft at the lower end of the motor driving a ring gear 94, which is directly coupled to the housing 92, through a reduction gear train. The pitch gimbal and motor housing 96 is similar to that shown in FIGURES 1, 2 and 3, a hysteresis motor being fitted to the tubular upper section of the gimbal in the same manner as that shown in FIGURE 1. The motor includes a stator 97, having a plurality of field coils fitted thereto, and a rotor 98 which surrounds and is attached to the cylindrical flywheel shaft. A tubular hysteresis ring 99, is attached to and surrounds the rotor 98 of the hysteresis motor.

The roll gimbal 100 is similar to that shown in FIGURE 1, a ring gear 101, fitted to a tubular extension of the roll gimbal. A bearing counter-rotating drive motor 102 having a pinion shaft 103 incorporated therewith, is provided to drive the ring gear 101, the pinion shaft of the motor either meshing directly with the ring gear 101, or driving the ring gear through a reduction gear drive mechanism.

A face gear 105 integral with the ring gear is utilized to drive the shafts mounted on the horizontal axes shown in FIGURES 1 and 2, in a manner similar to those shown in FIGURES 1 and 2.

The torque generating coils 106, 106a are similar to those shown in FIGURE 1, and are supported in the same manner. The permanent magnets 107, 107a which are supported by a bracket or brackets, are similar to those shown in FIGURE 1, the magnets co-acting with the torque generating coils in the manner hereinbefore described.

A pair of pick-off excitation coils 108, 109, is attached to a pair of plates, which are supported by a bracket attached to the pitch gimbal, in a manner similar to that shown in FIGURE 1.

A pick-off sensing coil 110 is located in the air gap between the two pick-off excitation coils 108, 109. The pick-off signals from the pick-off coils indicate the angular displacement about the two horizontal axes shown in FIGURES 1 and 2, in the same manner as the construction shown in FIGURES 1 and 2.

The pick-off signals are transmitted to a resolver 112 shown in FIGURE 7, the resolver functioning in the same manner as that shown in FIGURE 1.

The brush blocks 113 and the slip rings 114, shown in FIGURE 7, are substantially the same as those shown in FIGURE 1.

Figure 8:
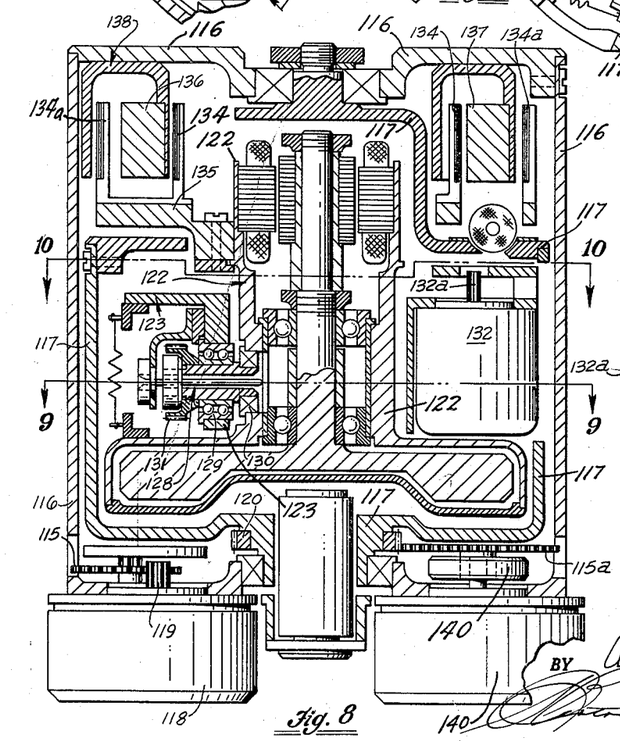
FIGURE 8 is a vertical section through another modification of the case rotating gyroscope, shown in FIGURE 1.
Figure 9:
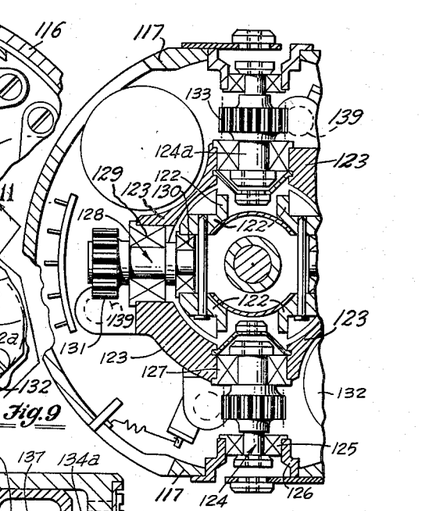
FIGURE 9 is a cross-section through the gyroscope shown in FIGURE 8, taken on the line 9—9, FIGURE 8.
Figure 10:
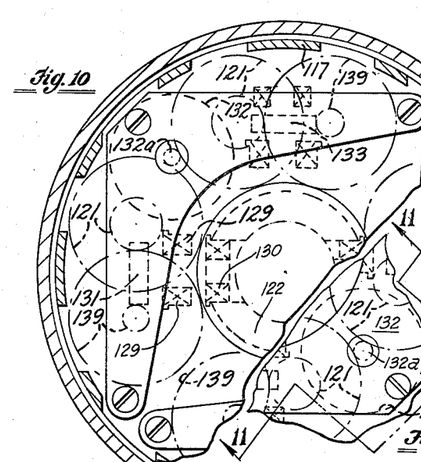
FIGURE 10 is a plan view and partial section through a portion of the gyroscope mechanism, shown in FIGURES 8 and 9, the section being taken on the line 10—10, FIGURE 8.

FIGURES 8 and 9 show another modification of the rotating housing gyro shown in FIGURES 1, 2, and 3.

In this construction, the outer case 116 is similar to that shown in FIGURE 1. The rotatable housing 117 is driven by a motor 118, having a pinion shaft 119 incorporated therewith.

The hub integral with the bottom wall of the housing 117 has a ring gear 120 fitted thereto, co-axially with the housing 117.

The motor pinion 119 drives a reduction gear train 115, 115a which meshes with the ring gear 120, thereby controlling the rotation of the housing 117.

The pitch gimbal and motor housing 122, shown in FIGURE 8, is substantially the same as that shown in FIGURE 1.

The roll gimbal 123, surrounding the pitch gimbal, functions in substantially the same manner as that shown in FIGURES 1, 2, and 3.

The roll gimbal 123 is pivotally supported by a pair of stub shafts 124, 124a, each of which is supported from the rotating housing 117 by an anti-friction bearing 125, which is in turn supported by a tubular insert 126, attached to the wall of the housing 117. A second anti-friction bearing 127 fitted to the roll gimbal is supported by the reduced diameter cylindrical section of each stub shaft.

The pitch gimbal 122 is supported from the roll gimbal by a pair of shafts 128, each of which is supported by an anti-friction bearing 129 inserted in the wall of the roll gimbal. The pitch gimbal 122 is in turn supported by a pair of bearings 130, each of which fits into the wall of the gimbal, and is supported by the cylindrical end of each shaft 128.

A drive pinion 131 is attached to the outer end of each of the shafts 128, the drive pinion being rotated by a face gear, which is driven by a gear drive motor 132 having a pinion shaft 132a incorporated therewith, in a manner similar to that shown in FIGURES 1, 2, and 3.

Figure 11:
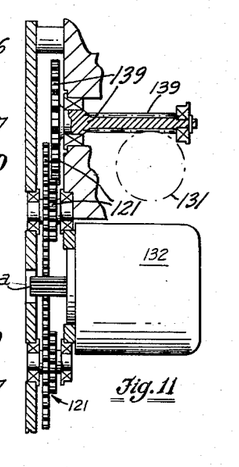
FIGURE 11 is a side elevational view of a portion of the contra-rotating bearing mechanism gear train, shown in FIGURE 8, the view being taken on the line 11—11, FIGURE 8.

A gear train 121, including a worm and wheel combination 139, shown in FIGURE 11, is utilized to drive the shaft pinions 131, and the corresponding pinions 133 attached to the stub shafts 124, which are utilized to drive the shafts 124, 128 from the drive pinion 132a of the motor 132.

The shafts 128, are rotated in opposite directions to balance the torques exerted by the shafts.

In the same manner the two stub shafts 124, 124a are rotated by the same reduction gear train and the face gear which rotates the shafts 128, a pinion 133 integral with each of the stub shafts meshing with the face gear to control the rotation of the shafts 124, 124a. The shafts 124, 124a located on opposite sides of the axis of the case are rotated in opposite directions for the reasons hereinbefore specified.

A pair of torque generating coils 134, 134a similar to those shown in FIGURE 1, is located at the upper end of the case, a flat flange 135, integral with a bracket attached to the pitch gimbal 122, supporting the coils 134, 134a.

One or more pair of permanent magnets 136, 137 is provided in conjunction with the torque generating coils, each of the magnets being supported by one leg of a bracket 138 of the U-cross-section supported by a cover attached to the open upper end of the case 116.

One of the magnets is located adjacent the inner face of the outer torque generating coils, in a manner similar to those shown in FIGURE 1.

A pick-off sensing coil is provided, the pick-off sensing coil functioning in substantially the same manner as that shown in FIGURES 1, 2 and 3.

The pick-off signals from the pick-off sensing coil are transmitted to a resolver 140, shown in FIGURE 8, the resolver being adapted to convert the rotating signals from the gyro pick-off coils to non-rotating signals.

The effect of housing rotation in a gyroscope of the type shown in FIGURES 1, 2 and 3, and the various modifications thereof, is to convert a constant direction gyro drift error to a sinusoidal function, which averages out to zero through one complete housing rotation. The counter-rotation of the respective inner races of the ball bearings reduces frictional losses to a minimum.

FIGURE 13 is a schematic diagram of the pick-off excitation and sensing coils 70, 78 and 77 shown in FIGURE 1.

The differential transformer action is obtained from two cylindrically wound air-core excitation coils, which sandwich a secondary coil 77.

The induced excitation, or primary field vectors are position so that a null is created midway between the two primary coils.

The primary coils are mounted on the pitch gimbal and motor housing 26. The secondary coil 77 which is attached to the rotary housing 18, generates a voltage proportional to that in the excitation coils 70, 78.

Thus when the secondary coil moves toward the lower primary coil 78, the secondary voltage increases linearly and is phased to the right-hand field vector. Movement of the sensing coil toward the upper excitation coil 78, causes an increasing signal which is phase-locked to the left-hand excitation field vector, thus causing the pick-off to provide a direction sensitive measure of gimbal rotation.

The gyro torque generating device is a two axis permanent magnet D.C. device, with two speaker-coil-type windings. The cylindrical winding forms are attached to the pitch gimbal and motor housing 26, with their axis co-linear with the axis of case rotation. Pure space torquing is achieved by means of these coils acting in the field of four permanent magnets 74, 74a, the magnets being equally spaced radially around the gyro case.

A speaker coil passes through the air gap in each magnet path. A roll axis will be induced by exciting one of the coils with a direct current voltage. The second coils will cause pitch axis torque.

FIGURE 14 is a diagrammatic representation of the case rotated gyroscope.

In this type of gyroscope, case rotation is employed to improve the space stabilization properties of the gyroscope. If the gyro housing 18 is rotated in the manner shown in FIGURE 14, some of the coupling torques will rotate with the housing, while others will remain fixed in space. The torques that are locked to the housing 18, will rotate about the gyro spin vector and induce a cyclical rather than a unidirectional precession. This will result in a zero average position error through 360 degrees of case or housing rotation.

It will be apparent to those skilled in the art, that the present invention is not limited to the specific details described above and shown in the drawings, and that various modifications are possible in carrying out the features of the invention and the operation and the method of support, mounting, adjustment and utilization thereof, without departing from the spirit and scope of the appended claims.

What is claimed is:

1. A two-axis gyroscopic apparatus, comprising a hollow outer case, a hollow tubular housing fitted to the interior of said outer case, means rotatably supporting the hollow housing, a first pivot roll gimbal fitted to the interior of the hollow housing, pivot means located in a plane substantially perpendicular to the axis of rotation of the hollow housing pivotally supporting said roll gimbal, a second pivot pitch gimbal supported by said first pivot roll gimbal, means located on an axis substantially perpendicular to the pivot axis of the first pivot roll gimbal adapted to pivotally support the second pivot pitch gimbal, and a flywheel mounted co-axially with the hollow housing, rotatably supported by the second pivot pitch gimbal, the pivot means supporting the first pivot gimbal from the hollow housing including a plurality of anti-friction bearings, each of said anti-friction bearings including an inner race and an outer race, located co-axially with one another, and means supported by said first pivot gimbal adapted to selectively reversibly rotate one of the races of each of said bearings relative to the other in order to reduce the frictional resistance of said anti-friction bearings, the pivot support means supporting the second pivot gimbal from the first pivot gimbal, including a plurality of anti-friction bearings supported by the first pivot gimbal, each of said anti-friction bearings including an inner race and an outer race, located co-axially with one another, and means supported by said first pivot gimbal adapted to selectively reversibly rotate one of the races of each of said bearings relattive to the other, in order to reduce the frictional resistance of said anti-friction bearings.

2. A two-axis gyroscopic apparatus comprising a hollow substantially cylindrical outer case, an inner substantially cylindrical hollow housing fitted to the interior of said outer case, co-axially therewith, means rotatably supporting the inner hollow housing, a first pivot gimbal, fitted to the interior of the hollow housing, pivot means located in a plane substantially perpendicular as to the axis of rotation of the hollow housing pivotally supporting said first pivot gimbal, a second pivot gimbal fitted to and supported by said first pivot gimbal, means located on an axis substantially perpendicular to the pivot axis of the first pivot gimbal, pivotally supporting the second pivot gimbal and a flywheel mounted co-axially with the axis of rotation of the hollow housing, rotatably supported by the second pivot gimbal, means supported by the outer case adapted to rotatably drive the hollow inner housing, the pivot means supporting the first pivot gimbal from the hollow housing including a plurality of anti-friction bearings, each of said anti-friction bearings including an inner race and an outer race, located co-axially with one another, and means supported by said first pivot gimbal adapted to selectively reversibly rotate one of the races of each of said bearings relative to the other in order to reduce the frictional resistance of said anti-friction bearings, the pivot support means supporting the second pivot gimbal from the first pivot gimbal, including a plurality of anti-friction bearings supported by the first pivot gimbal, each of said anti-friction bearings including an inner race and an outer race, located co-axially with one another, and means supported by said first pivot gimbal adapted to selectively reversibly rotate one of the races of each of said bearings relative to the other, in order to reduce the frictional resistance of said anti-friction bearings.

3. In combination with a two-axis gyroscopic apparatus as in claim 2, means supported by the outer case adapted to rotatably drive the hollow inner housing.

4. A two-axis gyroscopic apparatus comprising a hollow substantially cylindrical outer case, an inner substantially cylindrical housing fitted to the interior of said outer case, the axis of rotation of the hollow housing being co-axial with the longitudinal axis of the outer case, means fitted to the outer case rotatably supporting the hollow housing, a first gimbal fitted to the interior of the hollow housing, pivot means supported by the hollow housing, in a plane substantially perpendicular to the axis of rotation of the hollow housing pivotally supporting the first gimbal, a second gimbal fitted to and supported by said first gimbal, means located on an axis substantially perpendicular to the pivot axis of the first gimbal, pivotally supporting the second gimbal, a flywheel mounted co-axially with the axis of rotation of the hollow housing, a motor and gear reduction combination, supported by the outer case, adapted to rotatably drive the hollow inner housing, a substantially cylindrical shaft, integral with the flywheel, fitted to the second gimbal, co-axially with the axis of rotation of the hollow housing, means supported by the second gimbal adapted to rotatably drive the flywheel through the cylindrical shaft integral therewith, a plurality of anti-friction bearings fitted to the second gimbal, each of said bearings including an inner race and an outer race, and means including reduction gear means supported by the first gimbal adapted to reversibly rotate the outer races of said anti-friction bearings relative to the inner races thereof, to reduce the frictional resistance of said anti-friction bearings.

5. In combination with a two-axis gyroscopic apparatus, as in claim 4, a substantially cylindrical shaft, integral with the flywheel, fitted to the second gimbal, co-axially with the axis of rotation of the hollow housing, the pivot means supporting the first gimbal from the hollow housing including a plurality of anti-friction bearings, each of said anti-friction bearings including an inner race and an outer race, located co-axially with one another, and means connected to one of the races of each of said bearings adapted to co-act with the reduction gear means attached to the first gimbal to selectively reversibly rotate one of the races of each of said bearings relative to the other, in order to reduce the frictional resistance of said anti-friction bearings.

6. In combination with a two-axis gyroscopic apparatus, as in claim 4, the pivot support means supporting the second gimbal from the first gimbal including a plurality of anti-friction bearings supported by the first gimbal, each of said anti-friction bearings including an inner race and an outer race located co-axially with one another, the reduction gear means attached to the first gimbal being adapted to simultaneously selectively rotate one of the races of each of said anti-friction bearings relative to the other, in order to reduce the frictional resistance of said anti-friction bearings.

7. In combination with a two-axis gyroscopic apparatus as in claim 4, the pivot means supporting the first gimbal from the hollow housing including a plurality of anti-friction bearings, each of said anti-friction bearings including an inner race and an outer race, located co-axially with one another, and means connected to one of the races of each of said bearings adapted to co-act with the reduction gear mechanism attached to the first gimbal to selectively reversibly rotate one of the races of each of said bearings relative to the other, the races located on one side of the axis of the hollow housing being rotated in a direction opposite those on the other side thereof, the pivot support means supporting the second gimbal from the first gimbal, including a plurality of anti-friction bearings supported by the first gimbal, each of said anti-friction bearings including an outer race and an inner race, located co-axially with one another, and means connected to one of the races of each of said bearings adapted to co-act with the reduction gear mechanism attached to the first gimbal, to selectively reversibly rotate one of the races of each of said bearings relative to the other, the races located on one side of the axis of rotation of the hollow housing being rotated in a direction opposite those on the opposite side thereof.

8. A two-axis gyroscopic apparatus comprising a hollow substantially cylindrical outer case, an inner substantially cylindrical hollow housing rotatably fitted to the interior of said outer case, the axis of rotation of the hollow housing being co-axial with the longitudinal axis of the outer case, means fitted to the outer case, rotatably supporting the hollow housing, means attached to the outer case adapted to rotatably drive the inner housing about the axis of rotation thereof, a first gimbal fitted to the interior of the hollow housing, pivot means located in a plane substantially perpendicular to the axis of rotation of the hollow housing pivotally supporting the first gimbal, said pivot means including a plurality of anti-friction bearings means adapted to reversibly rotate a portion of each of said anti-friction bearings relative to the balance thereof, a second gimbal fitted to and supported by the first gimbal, means located on an axis substantially perpendicular to the pivot axis of the first gimbal, pivotally supporting the second gimbal, said pivot means including a plurality of anti-friction bearings, means adapted to reversibly rotate a portion of each of said anti-friction bearings relative to the balance thereof, a flywheel mounted co-axially with the axis of rotation of the hollow housing, a substantially cylindrical shaft, integral with the flywheel, fitted to the second gimbal, co-axially with the axis of rotation of the hollow housing, means supported by the second gimbal adapted to rotatably drive the flywheel through the cylindrical shaft integral therewith, a plurality of anti-friction bearings fitted to the second gimbal adapted to rotatably support the flywheel shaft, and means adapted to reversibly rotatably drive a portion of each of said anti-friction bearings, relative to the balance thereof, a plurality of pick-off excitation coils, supported by the second gimbal, the axis of support through said pick-off excitation coils being co-axial with the axis of rotation of the hollow housing, said pick-off excitation coils having an annular air gap therebetween, a plurality of pick-off sensing coils substantially parallel to the pick-off excitation coils, located in the air gap between the pick-off excitation coils, said pick-off sensing coils being adapted to transmit electrical signals indicating the angular displacement of the first gimbal and the second gimbal, about the pivot axes of said first and second gimbals, relative to the hollow rotatable housing, a resolver adapted to receive the displacement signals from the pick-off sensing coils, and convert said signals to signals in stationary space.

9. In combination with a two-axis gyroscopic apparatus, as in claim 8, a plurality of substantially circumferentially located torque generating coils supported by the second gimbal, said torque generating coils being co-axial with the axis of rotation of the hollow housing, a plurality of pairs of permanent magnets, located adjacent the torque generating coils, one magnet of each pair being diametrically aligned with the opposite magnet thereof, the permanent magnets in combination with the torque generating coils being adapted to generate forces about perpendicular axes, in a plane through the pivot axes of the inner and outer gimbals, and means adapted to transmit electrical signals to said torque generating coils to control the forces generated by the torque generating coils and the permanent magnets co-acting therewith.

10. In combination with a two-axis gyroscopic apparatus, as in claim 8, a plurality of substantially circumferentially located torque generating coils supported by the second gimbal, said torque generating coils being co-axial with the axis of rotation of the hollow housing, a plurality of pairs of permanent magnets located adjacent the torque generating coils, said permanent magnets being fixedly supported by the fixed outer case, one magnet of each pair being diametrically aligned with the opposite magnet thereof, the permanent magnets, in combination with the torque generating coils, being adapted to generate forces about a pair of perpendicular axes, in a plane through the pivot axes of the inner and outer gimbals.

11. A two axis gyroscopic apparatus comprising a hollow substantially cylindrical outer case, an inner substantially cylindrical hollow housing fitted to the interior of said outer case, co-axially therewith, means rotatably supporting the inner hollow housing, a first pivot gimbal fitted to the interior of the hollow housing, pivot means located in a plane substantially perpendicular to the axis of rotation of the hollow housing pivotally supporting said first pivot gimbal, a second pivot gimbal fitted to and supported by said first pivot gimbal, means located on an axis substantially perpendicular to the pivot axis of the first pivot gimbal, pivotally supporting the second pivot gimbal, a flywheel mounted co-axially with the axis of rotation of the hollow housing, rotatably supported by the second pivot gimbal, a shaft integral with the flywheel fitted to the second pivot gimbal, co-axially with the inner hollow housing, anti-friction bearing means fitted to the second pivot gimbal adapted to rotatably support the flywheel shaft, and means attached to the flywheel shaft adapted to rotatably drive the flywheel, the pivot means supporting the first pivot gimbal from the hollow housing including a plurality of anti-friction bearings, each of said anti-friction bearings including an inner race and an outer race, located co-axially with one another, and means supported by said first pivot gimbal adapted to selectively reversibly rotate one of the races of each of said bearings relative to the other in order to reduce the frictional resistance of said anti-friction bearings, the pivot support means supporting the second pivot gimbal from the first pivot gimbal including a plurality of anti-friction bearings supported by the first pivot gimbal, each of said anti-friction bearings including an inner race and an outer race, located co-axially with one another, and means supported by said first pivot gimbal adapted to selectively reversibly rotate one of the races of each of said bearings relative to the other, in order to reduce the frictional resistance of said anti-friction bearings.

References Cited by the Examiner
UNITED STATES PATENTS

| | | | |
|---|---|---|---|
| 2,577,942 | 12/51 | Agins | 74—5 |
| 2,924,978 | 2/60 | Barnes | 74—5 |
| 2,970,480 | 2/61 | Zeigler et al. | 74—5 |

BROUGHTON G. DURHAM, *Primary Examiner.*